(12) United States Patent
Dutilly et al.

(10) Patent No.: US 8,246,471 B2
(45) Date of Patent: Aug. 21, 2012

(54) SYSTEM AND METHOD FOR DYNAMIC VIDEO GAME RECAP

(75) Inventors: Derek Thomas Dutilly, Valencia, CA (US); Michael Jacob, Simi Valley, CA (US); Amy Kalson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/282,361

(22) Filed: Oct. 26, 2011

(65) Prior Publication Data
US 2012/0040754 A1 Feb. 16, 2012

Related U.S. Application Data

(63) Continuation of application No. 12/322,193, filed on Jan. 29, 2009, now Pat. No. 8,088,012.

(51) Int. Cl.
*A63F 13/00* (2006.01)
*A63F 9/24* (2006.01)
*G06F 17/00* (2006.01)
*G06F 19/00* (2011.01)

(52) U.S. Cl. .................................................. 463/43

(58) Field of Classification Search .................... 463/43
See application file for complete search history.

(56) References Cited

U.S. PATENT DOCUMENTS
2006/0148571 A1 * 7/2006 Hossack et al. ................ 463/43

FOREIGN PATENT DOCUMENTS
JP 2010-207567 * 9/2010
* cited by examiner

*Primary Examiner* — Thien F Tran
(74) *Attorney, Agent, or Firm* — Farjami & Farjami LLP

(57) ABSTRACT

There is provided a system and method for providing dynamic recap sequences to a player of a video game. There is provided a method for use by a processor to present a recap sequence to a player of a video game, the method comprising storing, in a memory, identification data identifying the player and associated event data relating to the video game played by the player after a first game play, receiving the identification data to identify the player for a second game play, retrieving the event data from the memory, creating a prioritized event list including a number of events from the event data, generating the recap sequence based on the prioritized event list, and presenting the recap sequence to the player prior to the second game play. Creation of the prioritized event list can be customized to suit particular requirements of the video game.

20 Claims, 4 Drawing Sheets

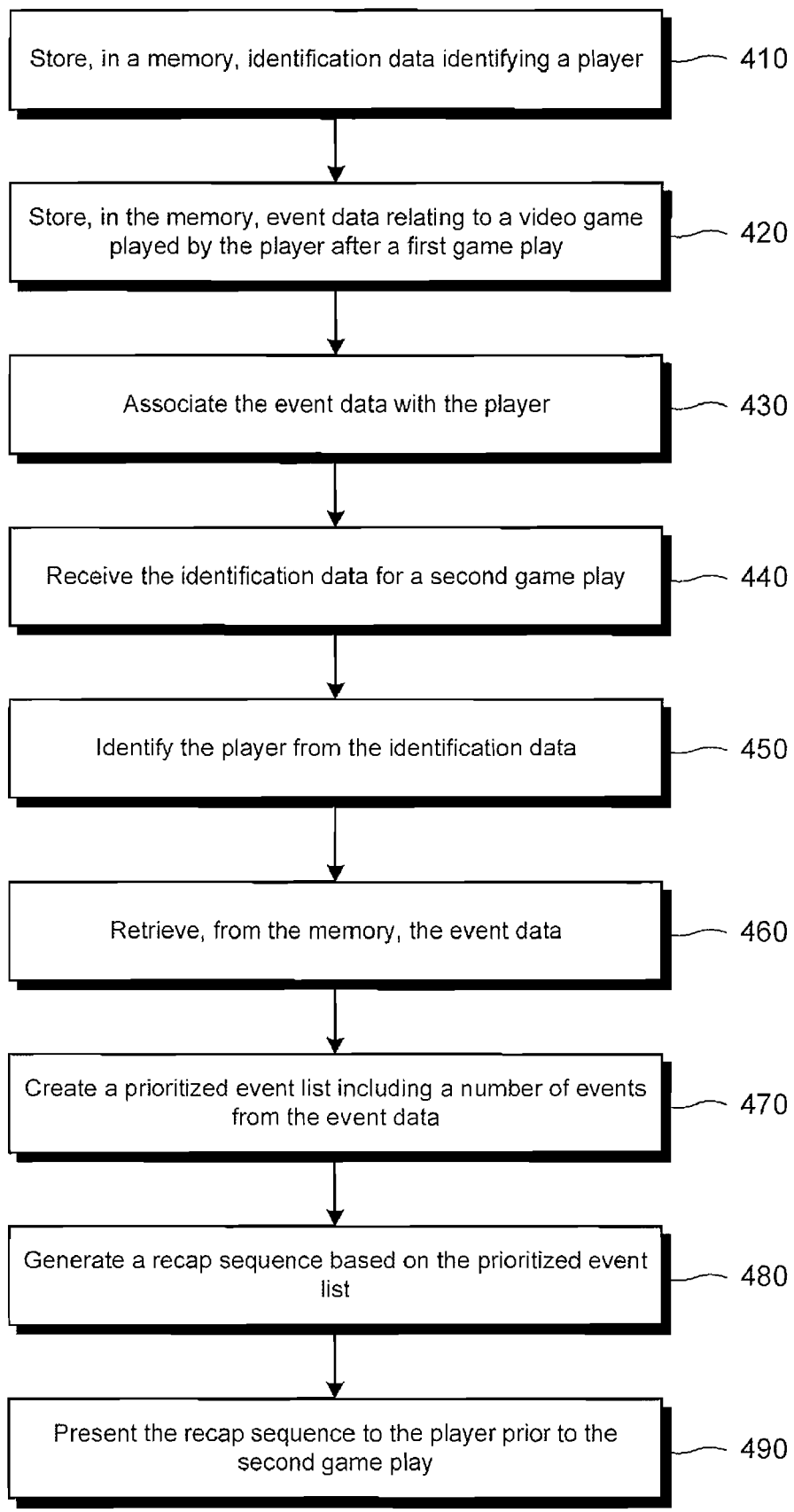

US 8,246,471 B2

SYSTEM AND METHOD FOR DYNAMIC VIDEO GAME RECAP

This application is a Continuation of U.S. patent application Ser. No. 12/322,193, filed on Jan. 29, 2009 now U.S. Pat. No. 8,088,012.

BACKGROUND OF THE INVENTION

1. Field of the Invention

The present invention relates generally to game systems. More particularly, the present invention relates to video game systems.

2. Background Art

Modern video game designs are becoming increasingly complex, offering branching storylines, numerous optional side quests and adventures, massive interactive worlds, and online multiplayer support. With so many things to see and do, it is easy for a player to become overwhelmed with the amount of freedom and flexibility provided. In contrast to traditional game design where players are forced through discrete and linear levels to progress through a game, many modern games feature a more open-ended game design where story events can occur out-of-order, or skipped entirely, depending on how the player interacts with the game design.

With such expansive gaming environments to interact with, many players cannot hope to accomplish everything they wish to do in one gaming session. Thus, modern game designs often allow players to stop and resume game play at any time or through a game construct such as a save point or progress diary, which allows players to enjoy a continuous game experience even if they can only afford a few hours of sporadically scheduled leisure time.

Unfortunately, because of the complexity of many modern gaming designs, an extended absence from game play can result in disorientation and a lack of direction, causing frustration and decreasing motivation to continue playing the game. For example, the player may have forgotten what was happening in the storyline, what important objectives are to be accomplished, where they are in the context of the game world, and if the game design is multiplayer, the progression of the other players in the online world. Faced with these numerous challenges for continuing game play, many players may opt instead to stop playing the game entirely, severely impacting their enjoyment, satisfaction, and value derived from the game.

While traditional game designs may have addressed the problem somewhat by introducing static recap scenes between discrete levels or segments of the game, static recap scenes only work serviceably in a fairly linear and restricted game design, where all players experience roughly the same storyline and game progression. Static recap scenes are therefore ill-suited to the demands of complex modern gaming systems which afford players much greater freedom in storyline direction and game play progression.

Accordingly, there is a need to overcome the drawbacks and deficiencies in the art by providing a way for a player of a video game offering substantial player freedom from strict linear game play to quickly and easily reorient themselves in the video game after resuming game play following a period of game play inactivity.

SUMMARY OF THE INVENTION

There are provided systems and methods for providing dynamic recap sequences to a player of a video game, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 shows a flowchart describing the steps, according to one embodiment of the present invention, by which a processor can present a recap sequence to a player of a video game.

DETAILED DESCRIPTION OF THE INVENTION

The present application is directed to a system and method for providing dynamic recap sequences to a player of a video game. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
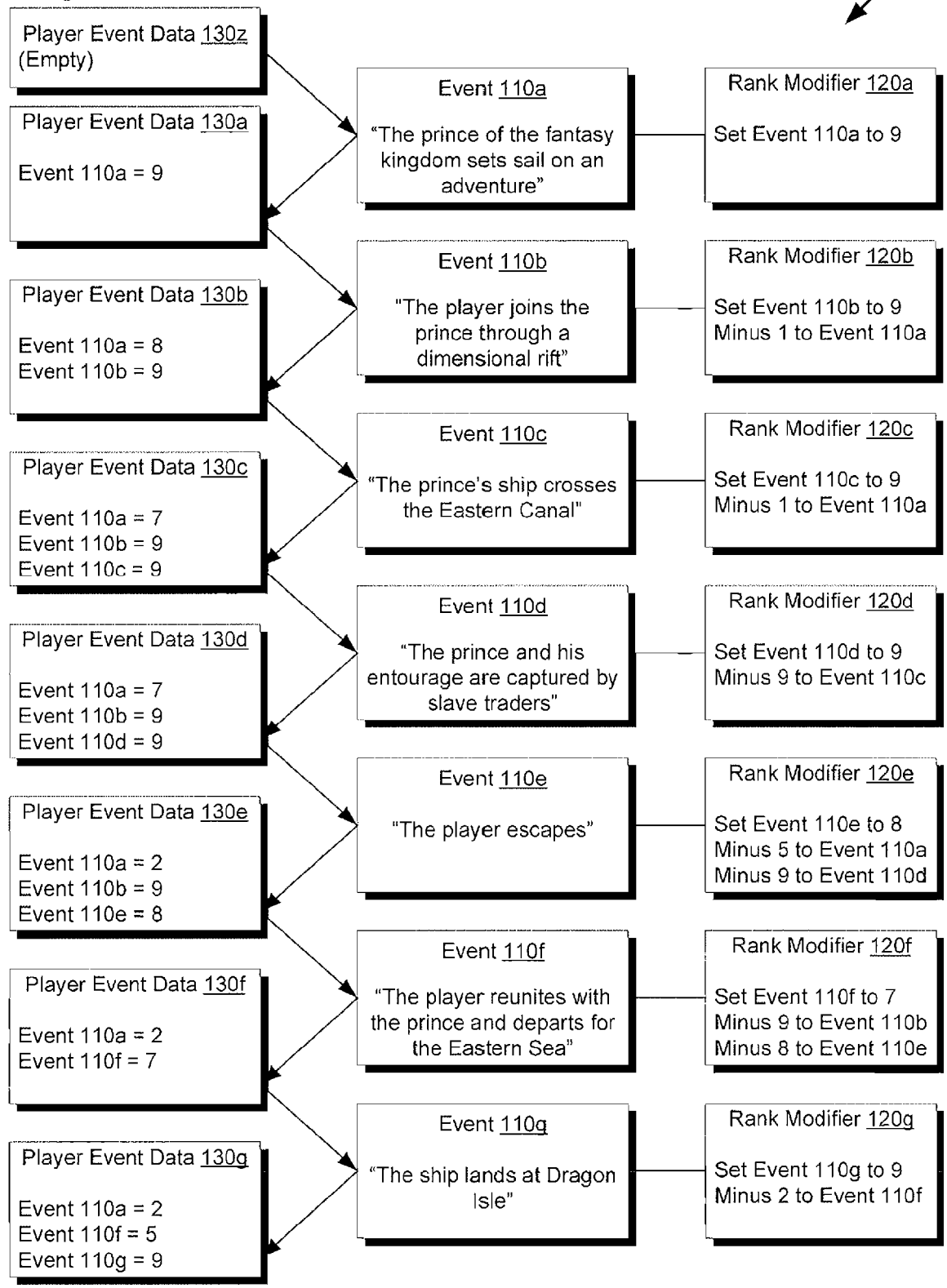
FIG. 1 presents a flowchart showing the progressive state of player event data as modified by experienced events, according to one embodiment of the present invention.

FIG. 1 presents a flowchart showing the progressive state of player event data as modified by experienced events, according to one embodiment of the present invention. Flowchart 100 includes player event data $130z$, player event data $130a$ to $130g$, event $110a$ to $110g$, and rank modifier $120a$ to $120g$.

FIG. 1 follows the progression of a video game as a player experiences different events as shown by event $110a$ to $110g$. The events are recorded in player event data $130a$ to $130g$, which is associated with the player. Each event within the player event data is assigned a relevancy ranking, which is created and modified by rank modifier $120a$ to $120g$. The relevancy ranking is an abstraction that represents how relevant the event is for the purposes of presenting a recap sequence to refresh the player's memory if the player decides to take a break from playing the video game. Rank modifiers are one method of updating the relevancy ranking as situations change for the player. As a new event is experienced, other events may decrease or increase in relevancy ranking. Once an event decreases to a relevancy ranking of zero or less, it is deemed irrelevant and is omitted from an associated player event data in FIG. 1. However, it should be noted that assigning a relevancy rank to events is only one method of organizing events for a recap system, and other systems may be developed to cater to the specific needs of a particular video game. For example, alternative embodiments might use time spent with game characters as a primary determinant for organizing events. Thus, the video game might keep track of which characters the player tends to couple with, and the relevancy rank system might be replaced with a character affinity system, where recap events are skewed towards characters the player spends the most time with. More generally, time spent pursing particular events, whether currently active or already in the past, may also affect the choice of events to use for a recap.

Another factor that might be used is time elapsed between the last game session. For example, if a very long time has elapsed since the last game play, the recap events might be extended or increased in number to present a more comprehensive overview to the player, who has likely forgotten many details due to the long absence from the game. Conversely, a very short absence, such as a few hours, might trigger very brief recap events, whereas a minor break, such as under an hour, might skip a recap presentation entirely.

The elapsed time since the last game play might also be used for a video game that is simulated to continue running even in the absence of the player. For example, in a pet raising or nurturing simulation, extended absences from the game may trigger events where the pet goes hungry or feels sad. The recap events might include these events that are simulated to occur while the player was away from the game.

In a video game supporting an online context where the game world is constantly changing in the absence of the player, the player might, upon logging in, be reprised of events that happened while the player was away from the online game world, such as general online world events or more specific events that affect fellow guild or team members. For example, if fellow guild members conducted a successful raid against their rival guild, data from that raid might be captured on the online servers and played back for the player to view, keeping the player up to date and reoriented with the online world and the actions of fellow teammates or rivals.

Of course, past events pertaining to the player in the online world could also be recapped for the player. If, for example, the player was in the middle of a lengthy active quest, key event portions of the quest might be recapped for the player. Rather than digging deep in a convoluted quest log or consulting lengthy notes, the player can be automatically provided with a highly customized and relevant recap specific to the player's past actions or currently active events, allowing the player to jump right back into the pace of the game even if a significant amount of time has passed since the last game play.

Additionally, although FIG. 1 shows a linear progression from event 110a to 110g, if event 110a to 110g were configured such that they could be experienced in any order without prerequisite events, the player might instead experience events 110a to 110g out of order, or may miss certain events entirely. For example, there might be several optional events that the player may choose to pursue or skip entirely. Additionally, there might be branching event paths, where selecting a particular branch of events closes access to other branches of events. As modern game designs provide more freedom to interact with game worlds beyond traditional linear paths, event systems can correspondingly evolve to support such player freedom. However, for simplicity and explanatory purposes, this application will focus on embodiments using only a linear event progression.

When the player first starts the video game, the player event data may begin as player event data 130z, having no particular information regarding the events the player has experienced. As the player progresses through the video game, interacts with the video game world, and experiences events, player event data can change state to reflect these experiences that are particular to the player's experience.

Going downwards in FIG. 1, the first event, event 110a, comprises "the prince of the fantasy kingdom sets sail on an adventure." This, for example, might comprise a non-interactive opening movie sequence that is presented to the player upon starting a new game. Since it is the only event the player has experienced so far, rank modifier 120a directs that it should be set to the highest relevancy rank 9. Since no other events have been experienced, no other event ranks need to be modified. As shown in player event data 130a, the state of the player event data is updated to reflect the new event relevancy rankings.

Next, event 110b comprises "the player joins the prince through a dimensional rift." As shown by rank modifier 120b, event 110b is given relevancy rank 9, whereas 1 relevancy rank point is subtracted from event 110a to result in relevancy rank 8, as reflected by player event data 130b. Thus, as presently ranked in player event data 130b, the player meeting the prince is given slightly more priority than the prince setting off for his adventures. This could be reflected in a recap by, for example, displaying a longer summary movie of event 110b, or showing a summary movie of event 110b before event 110a, or removing the summary movie of event 110a prior to removing the summary movie of event 110b if the total number of event movies needs to be reduced.

Other metrics besides the relevancy ranking could be factored in for affecting the presentation of a recap. For example, chronological ordering of events might be used rather than relevancy ranking order, so that a recap of event 110a displays before a recap of event 110b, even though event 110b has a higher relevancy ranking. The relevancy rankings might, in this case, be used only to select a limited number of events out of a larger number of experienced events. For example, player event data 130b might contain relevancy rankings for several events, but for brevity purposes only a few of the most relevant events might be shown in chronological order. Further examples of metrics for a weighting algorithm may be discussed below in conjunction with FIG. 3.

Returning back to the sequence of events the player experiences in FIG. 1, event 110c comprises "the prince's ship crosses the Eastern Canal." Rank modifier 120c gives event 110c a relevancy ranking of 9, and subtracts 1 point from event 110a. The results are shown in player event data 130c. Continuing, event 110d comprises "the prince and his entourage are captured by slave traders." Rank modifier 120d gives event 120d a relevancy ranking of 9 and subtracts 9 points from event 110c, rendering event 110c irrelevant. This can be observed by comparing player event data 130c with player event data 130d, where event 110c is removed and replaced by event 110d. Next, event 110e comprises "the player escapes," since the player was part of the prince's entourage. Rank modifier 120e gives event 110e a relevancy ranking of 8, subtracts 5 points from event 110a, and subtracts 9 points from 110d, resulting in the configuration shown in player event data 130e. Next, event 110f comprises "the player reunites with the prince and departs for the Eastern Sea." Rank modifier 120f gives event 110f a relevancy ranking of 7, subtracts 9 points from event 110b, and subtracts 8 points from event 110e, resulting in the configuration shown in player event data 130f. For the last event shown in FIG. 1, event 110g comprises "the ship lands at Dragon Isle." Rank modifier 120g gives event 110g a relevancy ranking of 9, and subtracts 2 points from event 110f. The resulting configuration can be seen in player event data 130g, where event 110a has 2 relevancy ranking points, event 110*f* has 5 relevancy ranking points, and event 110*g* has 9 relevancy ranking points. Depending on when the player decides to suspend game play, the appropriate player event data can be stored, read in the future, and used to present an appropriately customized recap specific to the past experiences of the player.

Figure 2:
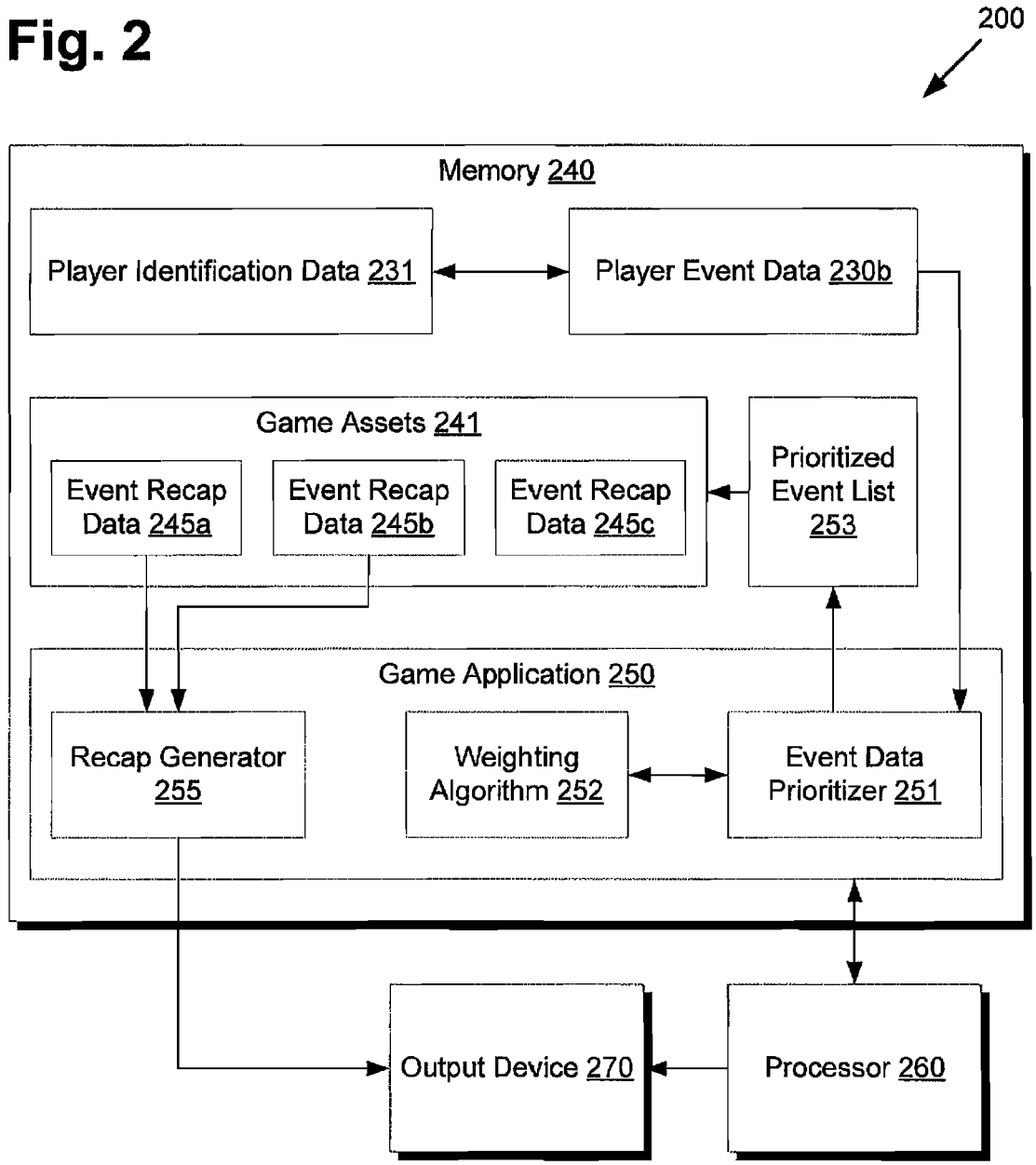
FIG. 2 presents a block diagram showing a system for providing dynamic recap sequences to a player of a video game, according to one embodiment of the present invention.

FIG. 2 presents a block diagram showing a system for providing dynamic recap sequences to a player of a video game, according to one embodiment of the present invention. Environment 200 includes memory 240, processor 260, and output device 270. Memory 240 includes player identification data 231, player event data 230*b*, game assets 241, prioritized event list 253, and game application 250. Player event data 230*b* may correspond to player event data 130*a* from FIG. 1. Game assets 241 include event recap data 245*a* to 245*c*. Game application 250 includes recap generator 255, weighting algorithm 252, and event data prioritizer 251.

Processor 260 and memory 240 might comprise, for example, hardware components supporting a video game platform, such as a personal computer, a video game console or portable gaming system, a mobile phone, or any other platform capable of providing interactivity with output to output device 270. Output device 270 might comprise a video display such as an LCD screen, an audio device such as a loudspeaker, a mechanical device providing haptic feedback, a scent generator, a hologram projector, or any other device designed to relay sensory information to the player pertaining to the state of the video game. Memory 240 may represent a state where the player has already played a first game play of game application 250, and thereafter suspended game play. Game application 250 can allow suspension of game play by saving the game state in player identification data 231 and player event data 230*b*. Player identification data 231 may include attributes specific to the player, such as names, appearance, account information, preferences, inventory, group memberships, and other identifying information. In an online gaming context, the player may be prompted for user credentials that are checked against account information in player identification data 231. In this case, player identification data 231 might be stored elsewhere, such as a centralized accounts database. Player event data 230*b* includes information about experienced events and possibly some information facilitating relevance ordering of the experienced events, and may be similar to player event data 130*b* shown in FIG. 1. Player identification data 231 references player event data 230*b* and vice versa, so that game application 250 can identify a particular player associated with a particular event data.

Assuming the player has returned from suspending the game and desires to start a second game play, providing identification credentials if necessary, game application 250 executing on processor 260 may initiate a procedure to generate a recap sequence for presentation on output device 270. Thus, game application 250 retrieves player identification data 231 and player event data 230*b* from memory 240. This saved state information can be used to prepare game application 250 to resume a game state prior to suspending the game, but before that, event data prioritizer 251 may process the saved state information. By using, for example, weighting algorithm 252, prioritized event list 253 can be generated. Previous example metrics for inclusion in weighting algorithm 252 have been given, such as using a relevancy rank value embedded within player event data 230*b* or using chronological event ordering. For the purposes of FIG. 2, weighting algorithm 252 may simply equal the relevancy rank value as provided by player event data 230*b*. Thus, prioritized event list 253 may include events similar to event 110*a* and event 110*b* from FIG. 1.

After generating prioritized event list 253, links to associated content can be determined for presentation to the player. In FIG. 2, the associated content is located within game assets 241 in the form of event recap data 245*a* to 245*c*. Each event recap data might comprise, for example, one or more video clips pertaining to the associated event. For example, if event recap data 245*a* pertains to event 110*a* from FIG. 1, event recap data 245 may include a video clip of the prince's ship preparing to sail off into the seas. The video clip might optionally include subtitles or voice over narration, which may be customizable by the player. Similarly, if event recap data 245*b* pertains to event 110*b* from FIG. 1, event recap data 245*b* may include a video clip showing the formation of the dimensional rift and the player falling into the rift. Recap data 245*c*, if pertaining to event 110*c* from FIG. 1, may include a video clip showing the ship moving across the Eastern Canal. Although recap data 245*c* and other recap data may exist within game assets 241, not all recap data may be utilized for a recap. Since prioritized event list 253 might omit a reference to event 110*c* from FIG. 1, processor 260 might also ignore corresponding event recap data 245*c*.

Although video clips are given as examples, they are only one particular method of video presentation. For example, alternative embodiments may employ several still frames or scrolling text, depending on production constraints or hardware platform limitations. Tight production schedules may preclude the feasibility of rendering full motion video recap segments, since development resources may need to be directed to other aspects of the game. Additionally, mobile platforms may lack processing resources or storage space to store and render full motion video clips.

Alternatively, an in-game rendering engine might be used to present recaps using rendering data, where rendering data for characters, objects, and scenes are stored for real-time rendering rather than relying on pre-rendered movie clips. An in-game rendering engine can process the rendering data to create a real-time recreation of past events within the game. This process may be similar to machinima, where movie clips are rendered using real-time rendering engines of games rather than professional 3D rendering software.

Besides video sequences, other sensory feedback could be provided if corresponding output devices are available. For example, a scent generator might provide olfactory cues of past events, an audio-only recording might provide a narrated sequence without video, a holographic projector might display a three-dimensional image, a mechanical device might generate Braille patterns for reading by touch, and a motor might provide force feedback for dramatic effect. In this manner, additional feedback besides a traditional visual cue from a display can be provided, providing both enhanced interactivity and greater accessibility. However, for the sake of simplicity, examples for the present application shall focus on embodiments having traditional audiovisual feedback as commonly used for video games.

Depending on whether event recap data 245*a* to 245*c* comprise pre-rendered movie data or rendering data for presenting a real-time movie, recap generator 255 can be configured to render scenes if necessary. After disparate recap scenes pertaining to individual events are prepared, recap generator 255 can concatenate the disparate recap scenes with transitions, apply voice-overs and/or subtitles, and otherwise prepare a continuous recap sequence to be presented to the player on output device 270. Recap generator 255 may output through output device 270 while generating the recap sequence, provided processor 260 has enough processing power to render any desired transition effects and other transformations in real-time. If this is not feasible, then recap generator 255 may pre-render the recap sequence before outputting to output device 270, reducing the processing burden on processor 260.

Figure 3:
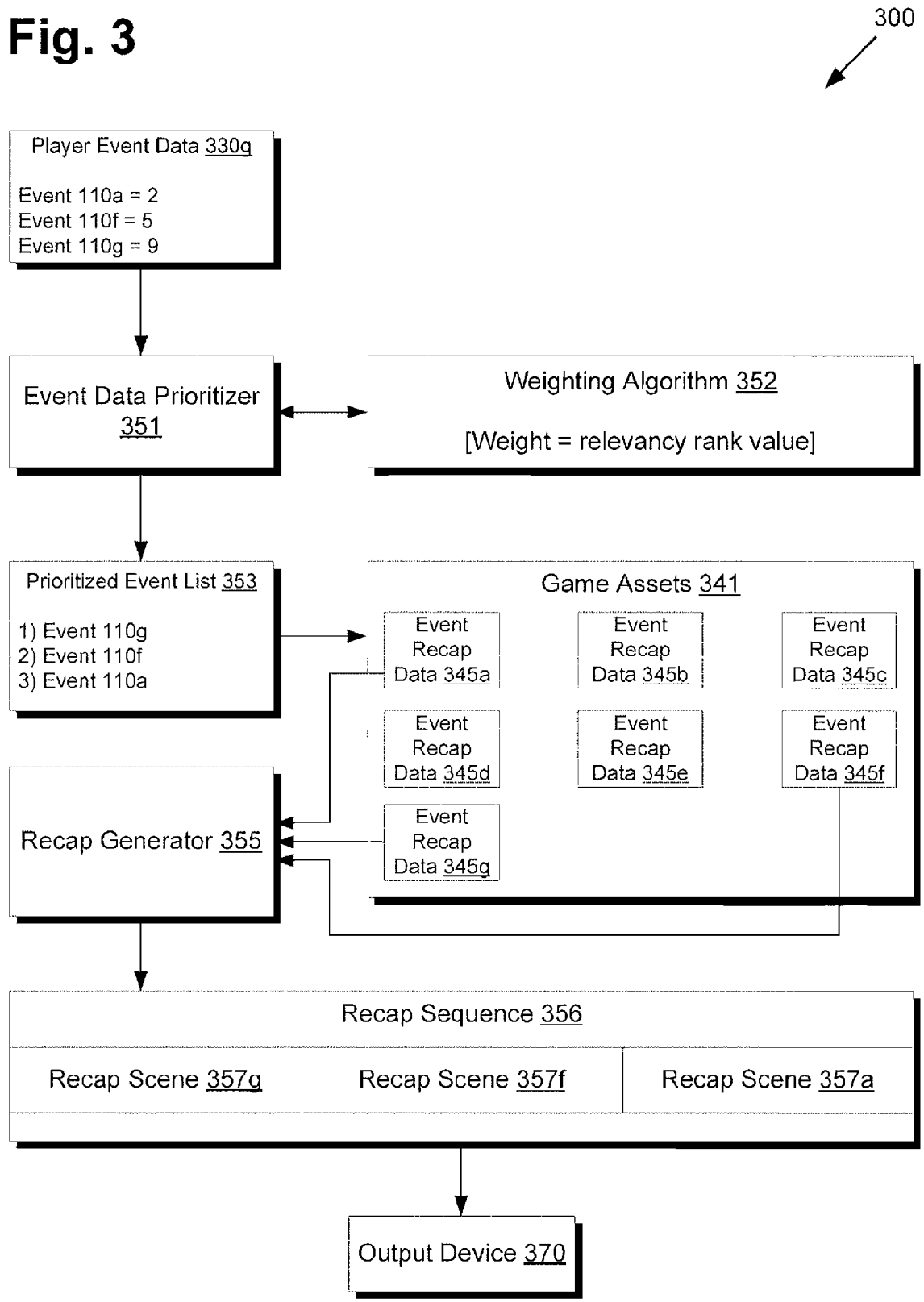
FIG. 3 presents a block diagram showing a system for transforming player event data into a recap sequence for output to an output device, according to one embodiment of the present invention.

FIG. 3 presents a block diagram showing a system for transforming player event data into a recap sequence for output to an output device, according to one embodiment of the present invention. Environment 300 includes player event data 330g, event data prioritizer 351, weighting algorithm 352, prioritized event list 353, game assets 341, recap generator 355, recap sequence 356, and output device 370. Game assets 341 include event recap data 345a to 345g. Recap sequence 356 includes recap scene 357g, recap scene 357f, and recap scene 357a. Player event data 330g corresponds to player event data 130g from FIG. 1, and refers to event 110a, 110f, and 110g from FIG. 1. Event data prioritizer 351 corresponds to event data prioritizer 251 from FIG. 2. Weighting algorithm 352 corresponds to weighting algorithm 252. Prioritized event list 353 corresponds to prioritized event list 253. Game assets 341 correspond to game assets 241. Event recap data 245a to 245g pertain to events corresponding to event 110a to 110g in FIG. 1. Recap generator 355 corresponds to recap generator 255 from FIG. 2. Output device 370 corresponds to output device 270.

FIG. 3 shows, via environment 300, how player event data 330g can be eventually transformed into recap sequence 356 for output through output device 370. Some elements from FIG. 2 are omitted from FIG. 3 to simplify the discussion and focus attention on data transformation steps, rather than supporting hardware. It may be assumed that the steps depicted in FIG. 3 are accomplished by a processor similar to processor 260 of FIG. 2, and that a storage device similar to memory 240 can provide any necessary data storage.

Beginning from the top of environment 300, event prioritizer 351 applies weighting algorithm 352 to player event data 330g, resulting in prioritized event list 353. Since weighting algorithm 352 simply equates the relevancy rank value for each event as the weighting metric, event prioritizer 351 sorts prioritized event list 353 by relevancy rank values indicated by player event data 330g. Thus, event 110g is listed first with 9 rank points, event 110f is listed second with 5 rank points, and event 110a is listed third with 2 rank points.

As previously discussed, weighting algorithm 352 could also integrate a number of other factors. For example, player identification data corresponding to player event data 330g could be used to determine the amount of time the player spends with particular characters in the game. Preferences for certain characters might be ascertained with that information, weighting algorithm 352 might therefore favor events also containing those preferred characters. Additionally, player identification data might be used to determine the types of game interaction the player favors. For example, a game may offer the player numerous interactive paradigms besides traditional action and adventure systems, such as social and romance systems, merchant and trade systems, and other interactions. The game might record the types of interactions the player favors, and weighting algorithm 352 might therefore favor events relevant to those types of interactions.

Besides using data relevant to the player, data relevant to other players or groups related to the player might be used as well. For example, the player might be a member of an association or a guild in a massively multiplayer online game. In this case, player event data from fellow association or guild members might be utilized, and weighting algorithm 352 might incorporate association or guild membership as one factor for selecting recap events to present to the player. Although these events may not directly pertain to the player, they may still be relevant in that they may affect a group or organization that the player belongs to. This relevancy may be particularly enhanced if the player is a high ranking or active participant in the group or organization.

Event prioritizer 351 might also truncate prioritized event list 353 to a limited number of elements to keep the recap reasonably brief, for example by limiting to three or less events. Since only three events exist in player event data 330g to begin with, no truncation is necessary in FIG. 3.

Prioritized event list 353 can then be examined and corresponding assets can be retrieved from game assets 341, including event recap data 345g, 345f, and 345. The remaining event recap data do not apply to the player's past experiences reflected in player event data 330g, and are therefore ignored by recap generator 355. Recap generator 355 thus creates recap sequence 356 such that the first played recap scene 357g corresponds to a rendering of event recap data 345g, the second played recap scene 357f corresponds to a rendering of event recap data 345f, and the third played recap scene 357a corresponds to a rendering of event recap data 345a. This particular ordering of recap scenes is determined by weighting algorithm 352, which only uses relevancy rank value as a sole metric. An alternative embodiment might factor chronological order in weighting algorithm 352, resulting in recap scene 357a playing first, recap scene 357f playing second, and recap scene 357g playing third. Recap sequence 356 can be directed to output device 370 in real-time or after pre-rendering. Thus, the player can view a recap sequence dynamically adjusted to the player's past experiences in the game, rather than a static recap sequence generically applicable to all players of the game.

FIG. 4 shows a flowchart describing the steps, according to one embodiment of the present invention, by which a processor can present a recap sequence to a player of a video game. Certain details and features have been left out of flowchart 400 that are apparent to a person of ordinary skill in the art. For example, a step may comprise one or more substeps or may involve specialized equipment or materials, as known in the art. While steps 410 through 490 indicated in flowchart 400 are sufficient to describe one embodiment of the present invention, other embodiments of the invention may utilize steps different from those shown in flowchart 400.

Referring to step 410 of flowchart 400 in FIG. 4 and environment 200 of FIG. 2, step 410 of flowchart 400 comprises processor 260 storing, in memory 240, player identification data 231 identifying a player. Step 410 would occur after the player decides to quit or suspend a first game play of game application 250 executing on processor 260. Game application 250 could, for example, prompt the player to save game progress, or might alternatively save game progress automatically without prompting the player. As previously discussed, player identification data 231 may include attributes specific to the player, such as names, appearance, account information, preferences, inventory, group memberships, and other identifying information.

Referring to step 420 of flowchart 400 in FIG. 4 and environment 200 of FIG. 2, step 420 of flowchart 400 comprises processor 260 storing, in memory 240, player event data 230b relating to game application 250 played by the player after the first game play described in step 410. Step 420 occurs in tandem with step 410, and is specific to the events the player experiences during the first game play. As previously discussed, this may include information about experienced events and possibly some information facilitating relevance ordering of the experienced events.

Referring to step 430 of flowchart 400 in FIG. 4 and environment 200 of FIG. 2, step 430 of flowchart 400 comprises processor 260 associating player event data 230b with the player. This can be accomplished by embedding references from player event data 230b to player identification data 231, and vice versa. By following the references, processor 260 can determine which event data belongs to which player, and vice versa.

Referring to step 440 of flowchart 400 in FIG. 4 and environment 200 of FIG. 2, step 440 of flowchart 400 comprises processor 260 receiving player identification data 231 stored in step 410 for a second game play. Prior to step 440, the player of game application 250 may have quit game application 250 to tend to other matters, and the player is now ready to resume a second game play. Game application 250 may therefore present the player with a dialog to confirm resuming the game where it was left off, or game application 250 may automatically resume from the first game play. To that end, the first step in resuming game play would be to retrieve data concerning the player, which would be player identification data 231 in this instance. Although FIG. 2 depicts player identification data 231 residing in memory 240, account information could alternatively be centralized in a database. This is particularly the case for a massively multiplayer online game, where a centralized server needs access to multiple player accounts to update an online world. In this case, step 450 might send a request for player identification data 231 from the database, rather than retrieving it locally from memory 240.

Referring to step 450 of flowchart 400 in FIG. 4 and environment 200 of FIG. 2, step 450 of flowchart 400 comprises processor 260 identifying the player from player identification data 231 retrieved in step 440. This step may be accomplished by processing player identification data 231. If player identification data 231 includes outside references to data, then these references can be followed and resolved in step 450. For example, in an online gaming context, game application 250 may prompt the user for credentials before allowing access to player identification data 231. In this case, some references in player identification data 231 pertaining to account information may be stored in the database discussed in step 440.

Referring to step 460 of flowchart 400 in FIG. 4 and environment 200 of FIG. 2, step 460 of flowchart 400 comprises processor 260 retrieving, from memory 240, player event data 230b. If no direct reference is available to player event data 230b, then player identification data 231, retrieved during step 440, might contain a reference allowing processor 260 to retrieve player event data 230b.

Referring to step 470 of flowchart 400 in FIG. 4 and environment 200 of FIG. 2, step 470 of flowchart 400 comprises processor 260 creating prioritized event list 253 including a number of events from player event data 230b retrieved in step 460. This process has already been described in some detail, but to summarize, event data prioritizer 251 applies weighting algorithm 252 against player event data 230b to generate prioritized event list 253. However, a weighting system is not the only method to sort events, and event data prioritizer 251 may be adaptable to suit the particular needs of game application 250.

Referring to step 480 of flowchart 400 in FIG. 4 and environment 200 of FIG. 2, step 480 of flowchart 400 comprises processor 260 generating a recap sequence based on prioritized event list 253 via recap generator 255. Step 480 has already been discussed in some detail, but to summarize, prioritized event list 253 can be parsed to find corresponding resources within game assets 241, or event data 245a and event data 245b in the case of FIG. 2. Recap generator 255 can then apply any desired transformations to generate the resulting recap sequence, such as concatenation, fading transitions, voice-overs, subtitles and captions, and other effects, As previously discussed, event recap data 245a and event recap data 245b could comprise many different formats, such as pre-rendered video, rendering data for real-time video, still frames for sequential video presentation, scrolling text data, audio data, scent data, haptic or force feedback data, three-dimensional projection data, and other data presentation formats, Referring to step 490 of flowchart 400 in FIG. 4 and environment 200 of FIG. 2, step 490 of flowchart 400 comprises processor 260 outputting the recap sequence from step 480 through output device 270. As previously discussed, this might occur concurrently with step 480 if processor 260 has enough computing resources to render in real-time. If processor 260 is lacking in computing resources, then step 480 might be fully completed prior to step 490, allowing processor 260 to playback the resulting pre-calculated output sequence through output device 270, at the cost of introducing longer wait times. In either case, the end result to the player is the same, as the player is able to view a dynamic video game recap sequence specifically tailored to the player's past experiences in the video game.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also he understood that the invention is not limited to the particular embodiments described herein, but is capable of many rearrangements, modifications, and substitutions without departing from the scope of the invention.

What is claimed is:

1. A system for presenting a recap sequence of past events pertaining to a video game to a player of the video game, the system comprising:
 a memory; and
 a processor configured to execute the video game to:
  store, in the memory, the past events for the video game;
  store, in the memory, a game state when the first game play of the video game is suspended;
  receive identification data from the player for a second game play;
  identify the player in response to receiving the identification data;
  retrieve, from the memory, the past events and the game state in response to identifying the player;
  generate a recap sequence based on the past events;
  present the recap sequence for the second game play; and
  resume the second game play based on the game state.

2. The system of claim 1, wherein the recap sequence is a video sequence of past events.

3. The system of claim 1, wherein the recap sequence is an audio sequence of past events.

4. The system of claim 1, wherein the recap sequence is an image sequence of past events.

5. The system of claim 1, wherein the game state represents a state of the video game prior to the second game play.

6. The system of claim 1, wherein the recap sequence is based on events experienced by the player during the first game play.

7. The system of claim 1, wherein the recap sequence is based on events occurred in the video game since the second game play.

8. The system of claim 1, wherein a length of the recap sequence is based on a time elapsed between the first game play and the second game play.

9. The system of claim 1, wherein the recap sequence is a video sequence of past events experienced by the player during the first game play.

10. The system of claim 1, wherein the processor is further configured to present the recap sequence for the second game play to a video display of one or more of a personal computer, a video game console or portable gaming system and a mobile phone.

11. A method for use by a processor to present a recap sequence of past events pertaining to a video game to a player of the video game, the method comprising:
 storing, in a memory, the past events for the video game;
 storing, in the memory, a game state when the first game play of the video game is suspended;
 receiving identification data from the player for a second game play;
 identifying the player in response to receiving the identification data;
 retrieving, from the memory, the past events and the game state in response to identifying the player;
 generating a recap sequence based on the past events;
 presenting the recap sequence for the second game play; and
 resuming the second game play based on the game state.

12. The method of claim 11, wherein the recap sequence is a video sequence of past events.

13. The method of claim 11, wherein the recap sequence is an audio sequence of past events.

14. The method of claim 11, wherein the recap sequence is an image sequence of past events.

15. The method of claim 11, wherein the game state represents a state of the video game prior to the second game play.

16. The method of claim 11, wherein the recap sequence is based on events experienced by the player during the first game play.

17. The method of claim 11, wherein the recap sequence is based on events occurred in the video game since the second game play.

18. The method of claim 11, wherein a length of the recap sequence is based on a time elapsed between the first game play and the second game play.

19. The method of claim 11, wherein the recap sequence is a video sequence of past events experienced by the player during the first game play.

20. The method of claim 11, wherein the presenting of the recap sequence includes presenting the recap sequence to a video display of one or more of a personal computer, a video game console or portable gaming system and a mobile phone.

* * * * *